United States Patent Office 2,848,346
Patented Aug. 19, 1958

2,848,346

PRODUCTION OF ZEOLITIC PIGMENTS

Orlando Leonard Bertorelli, Borger, Tex., assignor to J. M. Huber Corporation, Borger, Tex., a corporation of New Jersey No Drawing. Application May 16, 1955
Serial No. 508,831

7 Claims. (Cl. 106—288)

This invention relates to finely divided mineral pigments and, more particularly, to the production of new white zeolitic fillers or pigments chemically analogous to known zeolites but having extremely fine particle sizes and other special properties which make them valuable for use in rubber compounds, paper coatings, inks, paints, insecticides, plastics and similar materials as a powdery filler, conditioner or reinforcing pigment.

This invention is in the nature of a modification or improvement of my copending application Serial Number 183,467, filed September 6, 1950, now Patent No. 2,739,073.

Natural alkali metal zeolites such as natrolite ($Na_2O.Al_2O_3.3SiO_2.2H_2O$) and analcine $$(Na_2O.Al_2O_3.4SiO_2.H_2O)$$

are known to possess water softening properties but to have no usefulness as pigments. It also is well known that alkali silicates, such as water glass, can be reacted with aluminum sulfate to form gels which, after drying, are granular in nature and possess base exchange properties. Artificial zeolites of that type contain sodium, aluminum and silicon oxides in various proportions which usually are controlled by the addition of sodium aluminate during the reaction. In dried condition, they are hard granules having sharp edges and are exceedingly difficult to pulverize. Such artificial zeolites also lack essential characteristics of pigments.

It is an object of the present invention to provide valuable new zeolitic fillers or pigments which serve the uses first described above and consist essentially of finely divided zeolites precipitated in intimate association with finely divided pre-precipitated silica. Another object is to provide a commercially practical method of producing such pigments.

A further object is to provide an improved and more economical process of reacting alkali metal silicates and water soluble aluminum salts of mineral acids without formation of gels so as to produce finely divided or powdery white precipitates of exceedingly small particle size, substantially all the particles of which are smaller than 0.5 micron in diameter.

A more specific object of this invention is to provide new fillers or pigments which are especially useful in rubber compounds as reinforcing pigments to increase the tear resistance of the rubber compounds.

It has been discovered that finely divided zeolitic filler or pigment materials fulfilling the above mentioned and other important uses can be provided by combining in an aqueous medium, while strongly agitating the medium and keeping it alkaline, a dilute aqueous solution of an alkali metal silicate with an aqueous slurry of a finely divided precipitated silica suspended in a dilute aqueous solution of a salt of aluminum and a mineral acid. A reaction is brought about between the aluminum salt and the alkali metal silicate in the combined solutions, in such a manner that an extremely finely divided precipitated zeolitic material is formed in the aqueous reaction medium. This material is readily separable in finely divided form. It consists essentially of fine particles of a composition of oxides of an alkali metal, aluminum and silicon, i. e., a very finely divided precipitated zeolite, in intimate association with fine pre-precipitated particles of silica, and substantially all of its particles are smaller than 0.5 micron in diameter.

It has been found that the carrying out of the zeolite-forming reaction in the presence of a finely divided pre-precipitated silica makes it possible to obtain an extremely fine and valuable zeolitic pigment material more easily and more economically than when the reaction is carried out in the absence of such silica; and, in addition, it has been found that the material produced by this process serves at least as advantageously for the reinforcement of rubber compounds, without objectionably retarding vulcanization, as an otherwise similar pigment material produced in the absence of such silica, although the silica used normally acts as a strong retarder of vulcanization either when used alone or when used by admixing it with such otherwise similar pigment material.

An aqueous slurry containing the desired pre-precipitated silica in suspension in an aqueous solution of aluminum sulfate can be obtained and used advantageously according to this invention by employing finely divided kaolin as a basic raw material and decomposing the kaolin in an aqueous suspension with sulfuric acid. The term "kaolin" is used herein to designate kaolin or China clay or like clays composed predominantly of kaolinite. The decomposition of the kaolin may be carried out in an open vessel if the kaolin has previously been roasted at a temperature of 725° to 775° C. If unroasted kaolin is used it should be reacted with the acid in a closed vessel at a pressure of 150 to 160 p. s. i. The product of this decomposition process is essentially a dilute aqueous solution of aluminum sulfate containing a very finely divided free silica in suspension. The free silica contained in it has possessed little or no value as a filler or pigment material prior to the present invention. It has a strong retarding effect on rubber vulcanization, and it is not sufficiently pure to have value for chemical uses. On the other hand, when this free silica is present in the aqueous slurry used according to the present invention, the pre-precipitated free silica appears to be altered through the formation of the finely divided zeolite composition in intimate association with the silica, in such manner that the silica no longer either retards rubber vulcanization or is detrimental in various pigmentary uses of the resulting zeolitic material.

According to the most important embodiments of this invention, an aqueous slurry of finely divided precipitated silica suspended in a dilute aqueous solution of aluminum sulfate is obtained by the decomposition of kaolin with sulfuric acid as just described, and this slurry is combined with a dilute aqueous solution of an alkali metal silicate in the manner herein set forth. According to other embodiments of the invention, a suitably fine free silica, produced by any suitable precipitation process, is suspended in a separately formed dilute aqueous solution of a salt of aluminum and a mineral acid, to obtain the aqueous slurry for use in the present process.

The aluminum salts useful in the process include aluminum sulfate, aluminum chloride, aluminum nitrate and ammonium alum. Useful alkali metal silicates include all the common forms of sodium and potassium silicates, for example, metasilicates, disilicates and water glass. Being the least expensive, aluminum sulfate and sodium silicate naturally are preferred. The useful silicates contain $SiO_2$ in a molar ratio of from about 1 to about 3.6 to their content of alkali metal oxide.

The process of this invention may be carried out in accordance with the procedures disclosed in my copending application Serial Number 183,467, filed September 6, 1950. On the other hand, the conditions to be maintained within the reaction medium, especially with regard to the degree of dilution, are much less exacting in the practice of this invention. Much more concentrated solutions can be used without difficulty in the present process, enabling the use of substantially smaller apparatus for a given rate of zeolitic pigment production.

In the process of this invention, the aqueous solutions combined in the reaction medium are so proportioned that the medium is maintained in an alkaline condition and so that the fine zeolite composition formed by the reaction contains from about 0.8 to 1.3 mols of alkali metal oxide per mol of aluminum oxide and from about 4 to about 14 mols of silicon dioxide per mol of alkali metal oxide.

The most satisfactory procedure is to run the dilute solutions of the reactants slowly into a diluting aqueous medium, such as a body of water, preferably at widely spaced locations therein, while continuously and vigorously stirring the reaction medium so that a very low reactant concentration is maintained therein. In a simple and effective arrangement, the reaction medium is continuously agitated in an open vessel by a propeller type agitator while one solution is added to the vortex created by the propeller and the other solution is added near the wall of the vessel. Alternatively, the two solutions may be introduced into the vessel at different levels, one of which is below the surface and the other at the surface of the agitated liquid. In this manner, an extremely high degree of dilution of each solution is assured before the solutions contact and react with each other.

In such a procedure the dilute aqueous slurry used in the reaction should contain the aluminum salt in a molar concentration not exceeding about 0.75 mol per liter, and the alkali metal silicate solution used should contain not more than about 1.3 mols of the silicate per liter.

The most effective procedure is to combine the reactants at relative inflow rates such that the reaction medium is maintained at a pH of about 10.4 to 10.9. Under these conditions, even though the concentrations of the solutions are near the upper limits indicated above, there is no objectionable tendency for a gel to form in the course of the reaction. This effect is apparently attributable to the presence of the preformed finely precipitated silica in the reaction medium.

Upon completion of the reaction procedure the precipitated pigment material is usually separated from the reaction liquid by filtration, but other means of separation, such as centrifuging, can be used as well. It generally is desirable to wash the freshly separated material with water in order to remove water-soluble salts and the like, after which it may be dried in any suitable manner to obtain a filter cake which easily disintegrates into a fine powder. The drying preferably is performed at elevated temperatures. When dried at 110° C. the finished pigments usually contain about 9 to 11% water, but this can be driven off by heating them at considerably higher temperatures, for example to about 500° C.

The specific gravity of the products of this invention ranges from about 2.07 for materials prepared from sodium metasilicate to about 2.17 for materials prepared from ordinary water glass. The materials prepared from sodium metasilicate have a higher degree of solubility in a hot 20% solution of sodium hydrogen sulfate than those prepared from sodium silicates having a higher silica content. It is believed that in all cases the pigment may contain the same sodium aluminum silicate as that which forms when using sodium metasilicate, but that the precipitated silicate is mixed with silica when sodium silicates having a higher silica content are used. Very small amounts of sulfate also are generally present, being trapped in the pigment. When using sodium meta-silicate, the reaction probably proceeds according to the equation:

$$4Na_2O \cdot SiO_2 + Al_2(SO_4)_3 \rightarrow Na_2O \cdot Al_2O_3 \cdot 4SiO_2 + 3Na_2SO_4$$

The following examples will further illustrate the invention.

Example 1

A slurry of finely divided precipitated silica in a solution of aluminum sulfate was prepared by reacting 1343 grams of commercial kaolin with 1463 grams of 95% sulfuric acid in 3150 ml. of water. The slurry was formed by agitating the kaolin with the sulfuric acid in a lead lined autoclave at a temperature of 186° C. for 10 hours. The reaction mass was cooled, discharged and made up to a volume of 7000 cc. by the addition of water. An examination of the finely divided precipitated silica particles suspended in the aqueous solution of aluminum sulfate showed that almost all of the precipitated silica particles were less than 0.2 micron in greatest dimension.

A separate aqueous solution was prepared containing 3440 grams of sodium disilicate ($Na_2O \cdot 2SiO_2$) made up to 15,000 cc.

A strongly agitated body of 10,000 cc. of water was provided in a reaction vessel. The disilicate solution was added to this body until the pH was 10.9. Then the rate of addition of the silicate solution was regulated so that the entire amount would be added in about 30 minutes, and the slurry of finely divided precipitated silica suspended in the solution of aluminum sulfate was added, at a point separated as far as practicable from the point of addition of the silicate, at a rate which maintained the pH of the aqueous reaction medium between about 10.5 and 10.9. After all of the silicate solution had been added, the addition of the slurry was continued until the pH had dropped to about 9.0. Stirring was continued for 15 minutes. Thereafter the precipitate was recovered by filtration, washed with water and dried at 110° C. The filter cake was obtained in the form of soft lumps. Upon passing these lumps once through a hammer mill a white powder was obtained, substantially all the particles of which were smaller than .05 micron in their greatest diameter.

The pigment of this example was used to prepare the following light tan colored shoe sole compound:

| Material: | Parts by weight |
|---|---|
| GRS synthetic rubber | 100.0 |
| Polyvinyl chloride | 20.0 |
| Zeolitic pigment of this example | 70.0 |
| Zinc oxide | 3.0 |
| Stearic acid | 2.0 |
| Sulfur | 2.5 |
| Cumar resin | 7.5 |
| Dibenzothiazyldimethylthiolurea | 2.0 |
| Diorthotolyl guanidine | 1.0 |

This compound, when vulcanized for six minutes at 320° F., had a high resistance to tear and an abrasion resistance 54% as good as a standard tire tread stock.

In accordance with this example, zeolitic pigment materials can be prepared containing oxides of sodium, aluminum and silicon in the molar ratios of about 0.8 to 1.3 mols of $Na_2O$ per mol of $Al_2O_3$ and from about 6 to 16 mols of $SiO_2$ per mol of $Na_2O$ depending upon the type of silicate used and the pH of the final reaction medium.

In other examples similar to Example 1, valuable zeolitic pigment materials have been prepared by use of sodium silicates containing respectively 1.4, 1.83, 2.34, 2.8 and 3.3 mols of $SiO_2$ per mol of $Na_2O$. The materials obtained in these practices possess properties similar to those of the product of Example 1.

Example 2

Three zeolitic pigment materials were prepared from aluminum sulfate and the same type of sodium silicate as follows:

(1) A first material was prepared from a solution of sodium disilicate and a solution of a commercial grade of aluminum sulfate containing no silica, as follows:

A 4600 milliliter aluminum sulfate solution containing 0.68 mol of aluminum sulfate per liter was prepared by dissolving 1870 grams (3.15 mols) of commercial grade aluminum sulfate in 3 liters of water and then adding water to increase the volume of the solution to 4600 milliliters.

A 10 liter sodium disilicate solution was prepared by dissolving 2290 grams (12.6 mols) of anhydrous sodium disilcate in 8 liters of water and thereafter adding water to increase the volume of the solution to 10 liters.

A strongly agitated body of 10,000 cc. of water was provided in a reaction vessel. The disilicate solution was added to this body until the pH was 10.7. Then the introduction of the aluminum sulfate solution was begun and the rates of introduction of the sodium disilicate solution and the aluminum sulfate solution were regulated so as to maintain the pH of the aqueous medium relatively constant at about 10.7. After all of the sodium disilicate was added, the flow of aluminum sulfate was continued until the pH of the reaction mass was reduced to 9.1. The introduction of the aluminum sulfate solution and the sodium disilicate solution required about 30 minutes. Stirring was continued for an additional 15 minutes. Thereafter the precipitate was recovered by filtration, washed with water to remove sodium sulfate, and dried. The filter cake obtained was in the form of soft lumps. The zeolitic pigment material was obtained by passing the lumps once through a hammer mill.

(2) A second material was prepared as follows, by the use of an aqueous reaction slurry obtained by the decomposition of kaolin:

A slurry of finely divided precipitated silica in a solution of aluminum sulfate was prepared by reacting sulfuric acid and kaolin in the manner previously described in Example 1. The slurry was diluted with water until the molar concentration was 0.68 mol of aluminum sulfate per liter. In the preparation of the zeolitic pigment, 4600 milliliters of this slurry was used.

The second material hereof was prepared in the same manner as the first material of this example with the exception that the slurry of finely divided precipitated silica in a solution of aluminum sulfate was used instead of the aqueous solution of commercial grade aluminum sulfate, and the final pH of the solution was adjusted to 8.9 instead of 9.1.

(3) A third material was prepared by mechanically mixing a portion of the first material with a quantity of dried free silica separated from a kaolin decomposition slurry like that from which the second material was produced, the proportion of silica in this mixture being the same as the proportion of silica contained in the second material.

Three different rubber compounds were prepared similarly but with the use of the three different zeolitic materials, each compound containing:

| Material: | Amount |
|---|---|
| Smoked sheet rubber | parts 100 |
| Zinc oxide | do 5 |
| Sulfur | do 3 |
| Stearic acid | do 3 |
| Dibenzothiazyldimethylthiourea accelerator | do 1.5 |
| Zeolitic material | volumes 25 |

The compounds respectively containing the first material and the second material vulcanized normally at 287° F., and after 30 minutes of vulcanization their tensile strength was over 3000 pounds per square inch.

The compound containing the third material, when vulcanized under the same conditions, had a tensile strength of only 620 pounds.

When $SiO_2$ is present in the alkali metal silicates employed in the process of this invention in the larger molar ratios to the alkali metal oxides, it may be advantageous, although it is not necessary, when the product is intended for use in rubber, to add small amounts of an alkaline earth hydroxide to the aqueous suspension of the very finely divided precipitated zeolite and the pre-precipitated silica before filtration. In accordance with a special embodiment of the invention, an alkaline earth hydroxide, such as a solution of $Ca(OH)_2$, is strongly stirred into the suspension in an amount sufficient to bind a substantial amount of free silica. It is desirable to adjust the pH of the suspension to between 8 and 9.5 before the addition of the $Ca(OH)_2$.

If the fine zeolite material produced is to be used in paper, plastics, inks, insecticides or the like, the pH may be adjusted after the completion of the reaction to a value even lower than 8 to 9.5.

It will be understood that the foregoing detailed description and examples are illustrative only, for many variations and changes may be made in the reactants and in conditions of the process or the products without departing from the substance of the invention as herein disclosed and defined in the appended claims.

What is claimed is:

1. The process of producing a fine zeolitic material useful as a filler or reinforcing pigment, which comprises, while strongly agitating and keeping alkaline an aqueous reaction medium, combining in said medium an aqueous slurry of a finely divided precipitated silica suspended in a dilute aqueous solution of a salt of aluminum formable from a mineral acid, with an aqueous solution of an alkali metal silicate in which the molar ratio of $SiO_2$ to alkali metal oxide is from 1 to about 3.6, thereby precipitating in said medium in intimate association with said precipitated silica a composition of oxides of said alkali metal, aluminum and silicon substantially all the particles of which are smaller than 0.5 micron in diameter, the combined solutions being so proportioned that the molar ratio of alkali metal oxide to $Al_2O_3$ in said composition is from 0.8 to 1.3 and the molar ratio of $SiO_2$ to alkali metal oxide therein is from 4 to about 14, and separating, drying and disintegrating the precipitated material.

2. The process of producing a fine zeolitic material useful as a filler or reinforcing pigment, which comprises, while strongly agitating and keeping alkaline an aqueous reaction medium, combining in said medium an aqueous slurry of a finely divided precipitated silica suspended in a dilute aqueous solution of aluminum sulfate, with an aqueous solution of a sodium silicate in which the molar ratio of $SiO_2$ to $Na_2O$ is from 1 to about 3.6, thereby precipitating in said medium in intimate association with said precipitated silica a composition of oxides of sodium, aluminum and silicon substantially all the particles of which are smaller than 0.5 micron in diameter, the combined solutions being so proportioned that the molar ratio of $Na_2O$ to $Al_2O_3$ in said composition is from 0.8 to 1.3 and the molar ratio of $SiO_2$ to $Na_2O$ therein is from 4 to about 14, and separating, drying and disintegrating the precipitated material.

3. The process of producing a fine zeolitic material useful as a filler or reinforcing pigment, which comprises, while strongly agitating and maintaining at a pH of about 10.4 to 10.9 an aqueous reaction medium, combining in said medium an aqueous slurry of a finely divided precipitated silica suspended in a dilute aqueous solution of aluminum sulfate, with an aqueous solution of a sodium silicate in which the molar ratio of $SiO_2$ to $Na_2O$ is from 1 to about 3.6, thereby precipitating in said medium in intimate association with said precipitated silica a composition of oxides of sodium, aluminum and silicon substantially all the particles of which are smaller than 0.5 micron in diameter, the combined solutions being so proportioned that the molar ratio of $Na_2O$ to $Al_2O_3$ in said composition is from 0.8 to 1.3 and the molar ratio of $SiO_2$ to $Na_2O$ therein is from 4 to about 14, and separating, drying and disintegrating the precipitated material.

4. The process of producing a fine zeolite material useful as a filler of reinforcing pigment, which comprises, while strongly agitating and keeping alkaline an aqueous reaction medium, combining in said medium an aqueous slurry of aluminum sulfate and silica comprising the products of the decomposition of a finely divided kaolin in aqueous suspension with sulfuric acid, with a dilute aqueous solution of a sodium silicate in which the molar ratio of $SiO_2$ to $Na_2O$ is from 1 to about 3.6, thereby precipitating in said medium in intimate association with silica precipitated as a decomposition product of said kaolin a composition of oxides of sodium, aluminum and silicon substantially all the particles of which are smaller than 0.5 micron in diameter, the combined aqueous slurry and solution being so proportioned that the molar ratio of $Na_2O$ to $Al_2O_3$ in said composition is from 0.8 to 1.3 and the molar ratio of $SiO_2$ to $Na_2O$ therein is from 4 to about 14, and separating, drying and disintegrating the precipitated material.

5. The process of producing a fine zeolite material useful as a filler or reinforcement pigment, which comprises adding to a body of a diluting aqueous medium a sodium silicate in which the molar ratio of $SiO_2$ to $Na_2O$ is from 1 to about 3.6, until said medium has a pH of about 10.4 to 10.9, then, while strongly agitating said medium, flowing continuously thereinto at spaced locations therein, a dilute aqueous solution of said sodium silicate and a dilute aqueous slurry containing the precipitated silica and in solution the aluminum sulfate produced by the decomposition of a finely divided kaolin in aqueous suspension with sulfuric acid, the inflow of said aqueous slurry and the inflow of said solution being so proportioned that the pH of said medium is maintained at about 10.4 to 10.9, thereby precipitating in said medium in intimate association with said precipitated silica a finely divided composition of oxides of sodium, aluminum and silicon substantially all the particles of which are less than 0.5 micron in diameter and in which the molar ratio of $Na_2O$ to $Al_2O_3$ is from 0.8 to 1.3 and the molar ratio of $SiO_2$ to $Na_2O$ is from 4 to about 14, and separating, drying and disintegrating the precipitated material to obtain said zeolite material.

6. A fine zeolitic material useful as a filler or reinforcing pigment, consisting essentially of finely divided particles of a composition of oxides of sodium, aluminum and silicon precipitated in intimate association with finely divided particles of pre-precipitated silica, said composition containing from 0.8 to 1.3 mols of $Na_2O$ per mol of $Al_2O_3$ and from 4 to about 14 mols of $SiO_2$ per mol of $Na_2O$, and substantially all the particles of said material being smaller than 0.5 micron in diameter.

7. A zeolitic material useful as a fine filler or reinforcing pigment, consisting essentially of finely divided particles of a composition of oxides of sodium, aluminum and silicon precipitated in intimate association with finely divided particles of pre-precipitated silica, said material containing oxides of sodium, aluminum and silicon in the ratios from 0.8 to 1.3 mols of $Na_2O$ per mol of $Al_2O_3$ and from about 6 to 16 mols of $SiO_2$ per mol of $Na_2O$, and substantially all the particles of said material being smaller than 0.5 micron in diameter.

References Cited in the file of this patent

UNITED STATES PATENTS

| | | |
|---|---|---|
| 1,343,927 | Massatsch | June 22, 1920 |
| 1,842,394 | Endres | Jan. 26, 1932 |
| 1,990,751 | Ralston | Feb. 12, 1935 |
| 2,302,297 | Connolly | Nov. 17, 1942 |
| 2,512,053 | Calmon | June 20, 1950 |
| 2,551,014 | Kimberlin | May 1, 1951 |
| 2,739,073 | Bertorelli | Mar. 20, 1956 |